United States Patent [19]

Kawamura

[11] Patent Number: 5,095,856
[45] Date of Patent: Mar. 17, 1992

[54] ELECTROMAGNETIC VALVE ACTUATING SYSTEM

[75] Inventor: Hideo Kawamura, Koza, Japan

[73] Assignee: Isuzu Ceramics Research Institute Co., Ltd., Fujisawa, Japan

[21] Appl. No.: 571,530

[22] PCT Filed: Dec. 28, 1989

[86] PCT No.: PCT/JP89/01334
§ 371 Date: Aug. 28, 1990
§ 102(e) Date: Aug. 28, 1990

[87] PCT Pub. No.: WO90/07637
PCT Pub. Date: Jul. 12, 1990

[30] Foreign Application Priority Data

Dec. 28, 1988 [JP] Japan .................. 63-334959

[51] Int. Cl.⁵ .................................. F01L 9/04
[52] U.S. Cl. ........................ 123/90.11; 251/129.01
[58] Field of Search ............. 123/90.11; 251/129.01, 251/129.16

[56] References Cited

U.S. PATENT DOCUMENTS

| | | | |
|---|---|---|---|
| 4,359,022 | 11/1982 | Nakamura et al. | 123/188 AA |
| 4,614,170 | 9/1986 | Pischinger | 123/90.11 |
| 4,700,684 | 10/1987 | Pischinger | 123/90.11 |
| 4,715,332 | 12/1987 | Kreuter | 123/90.11 |
| 4,779,582 | 10/1988 | Lequesne | 123/90.11 |
| 4,823,825 | 4/1989 | Buchl | 123/90.11 |
| 4,846,120 | 7/1989 | Buchl | 123/90.11 |

FOREIGN PATENT DOCUMENTS

| | | |
|---|---|---|
| 376716 | 4/1990 | European Pat. Off. |
| 23507 | 3/1981 | Japan |
| 183805 | 10/1983 | Japan |
| 70013 | 5/1984 | Japan |
| 95912 | 6/1986 | Japan |
| 111 | 1/1988 | Japan |
| 2079412 | 2/1982 | United Kingdom |

Primary Examiner—E. Rollins Cross
Assistant Examiner—Weilun Lo
Attorney, Agent, or Firm—Staas & Halsey

[57] ABSTRACT

An electromagnetic valve actuating system opens and closes intake and exhaust valves of an engine under electromagnetic forces generated by an electromagnet. A reciprocally movable permanent magnet (4) is coupled to an intake/exhaust valve (7). A first electromagnet (3) confronts one end of the movable permanent magnet (4) in the direction in which it is reciprocally movable. A second electromagnet (5) confronts the other end of the movable permanent magnet (4). The intake/exhaust valve (7) is opened and closed under electromagnetic attracting and repelling forces acting between the movable permanent magnet (4), the first electromagnet (3), and the second electromagnet (5). Since the forces to open and close the intake/exhaust valve (7) can be varied by varying the energized conditions of the first and second electromagnets (3), (5), the timing to open and close the intake/exhaust valve (7) can be varied depending on the operating condition of the engine (1).

11 Claims, 2 Drawing Sheets

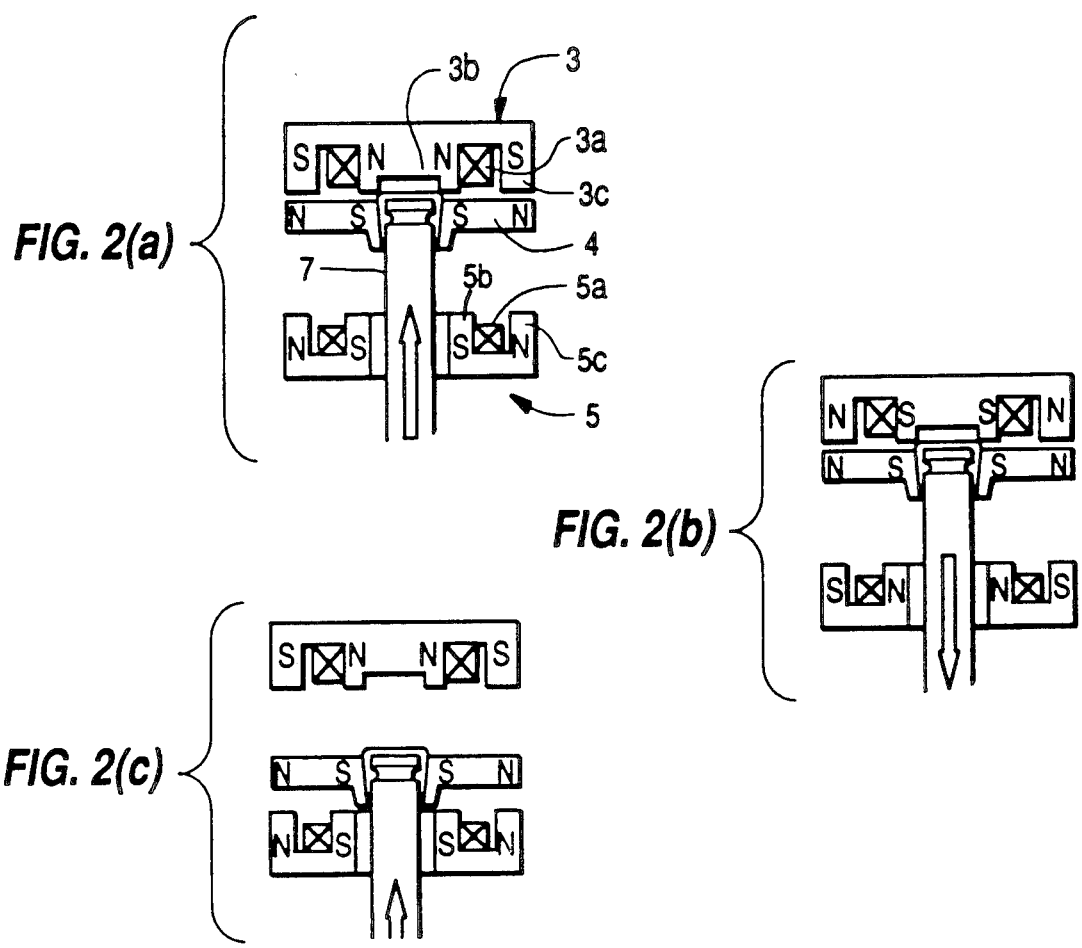
FIG. 2(a)
FIG. 2(b)
FIG. 2(c)
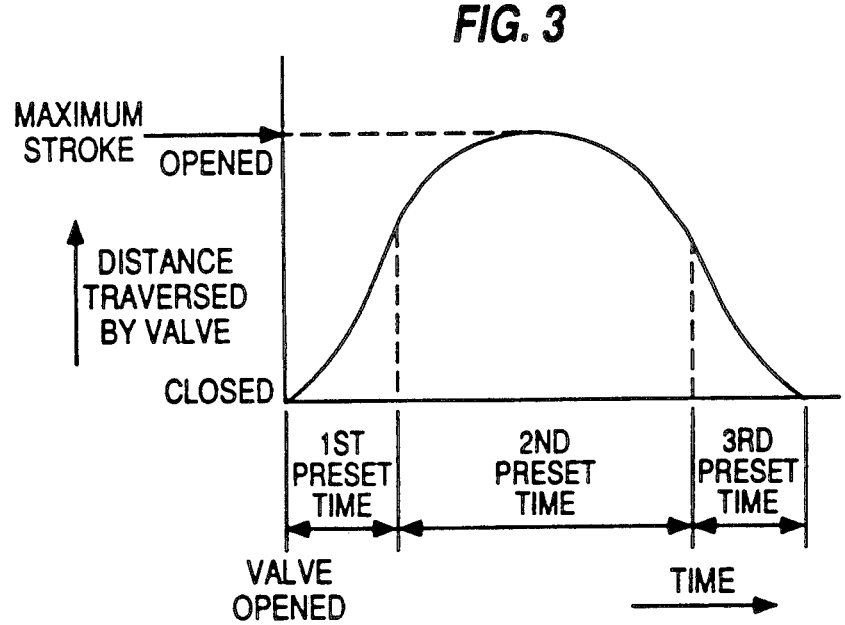
FIG. 3

ELECTROMAGNETIC VALVE ACTUATING SYSTEM

DESCRIPTION

1. Technical Field

The present invention relates to an electromagnetic valve actuating system for opening and closing intake and exhaust valves of an engine under electromagnetic forces generated by an electromagnet.

2. Background Art

Some conventional actuating systems for opening and closing intake and exhaust valves include a single camshaft which has cams for the intake and exhaust valves, the camshaft being disposed above or laterally of an engine. The camshaft is operatively connected to the crankshaft of the engine by a rotation transmitting means such as a belt, so that the camshaft can rotate synchronously with the rotation of the engine.

The valves have stems whose ends are pressed by cam surfaces of the camshaft through a link mechanism such as rocker arms or push rods. The intake and exhaust valves are normally closed by springs, and can be opened when their stem ends are pressed by the cam surfaces.

Alternatively, an intake camshaft having cams for acting on intake valves and an exhaust camshaft having cams for acting on exhaust valves are disposed above an engine. The intake and exhaust valves are opened when the stem ends of the intake valves are directly pushed by the cam surfaces of the intake camshaft and the stem ends of the exhaust valves are directly pushed by the cam surfaces of the exhaust camshaft.

Therefore, the above conventional actuating systems for opening and closing intake and exhaust valves include camshafts and link mechanisms added to the engine, which is thus necessarily large in size.

Since the camshafts and the link mechanisms are driven by the output shaft of the engine, the engine output power is partly consumed due to the frictional resistance produce when the camshafts and the link mechanisms are driven by the engine. As a result, the effective engine output power is reduced.

The timing with which the intake and exhaust valves are opened and closed cannot be altered during operation of the engine, but the valve opening and closing timing is preset such that the engine operates with high efficiency when it rotates at a predetermined speed. Therefore, the engine output power and efficiency are lower when the engine rotates at a speed different from the predetermined speed.

To solve the above problems, there have been proposed valve actuating systems for opening and closing intake and exhaust valves under electromagnetic forces from electromagnets, rather than with camshafts, as disclosed in Japanese Laid-Open Patent Publications Nos. 58-183805 and 61-76713.

However, the coils of the electromagnets disclosed in the above publications must be supplied with large electric energy in order to generate electromagnetic forces large enough to actuate the intake and exhaust valves, and hence the coils radiate a large amount of heat. As the electromagnets are associated with a cooling unit having a considerable cooling capacity, the problem of the large engine size still remains unsolved.

DISCLOSURE OF THE INVENTION

In view of the aforesaid problems, it is an object of the present invention to provide an electromagnetic valve actuating system for opening and closing intake and exhaust valves of an engine under electromagnetic forces from an electromagnet, rather than with a camshaft, the electromagnet being high in efficiency and output.

According to the present invention, there is provided an electromagnetic valve actuating system for opening and closing an intake/exhaust valve of an engine, comprising a first electromagnet having poles juxtaposed in one direction, a second electromagnet having a hole through which the intake/exhaust valve extends, the second electromagnet confronting and being spaced from the first electromagnet and having poles arranged in one direction, and a movable permanent magnet coupled to the intake/exhaust valve and disposed between the first and second electromagnets.

The movable permanent magnet coupled to the intake/exhaust valve is attracted and repelled by the first and second electromagnets, thereby opening and closing the intake/exhaust valve.

The forces tending to open and close the intake/exhaust valve are therefore rendered strong, and the actuating system may be reduced in size.

BRIEF DESCRIPTION OF THE DRAWINGS

FIGS. 2(a) through 2(c) are diagrams showing the poles of upper and lower electromagnets; and FIG. 3 is a diagram showing the relationship between the distance which the valve moves and time.

BEST MODE FOR CARRYING OUT THE INVENTION

Figure 1:
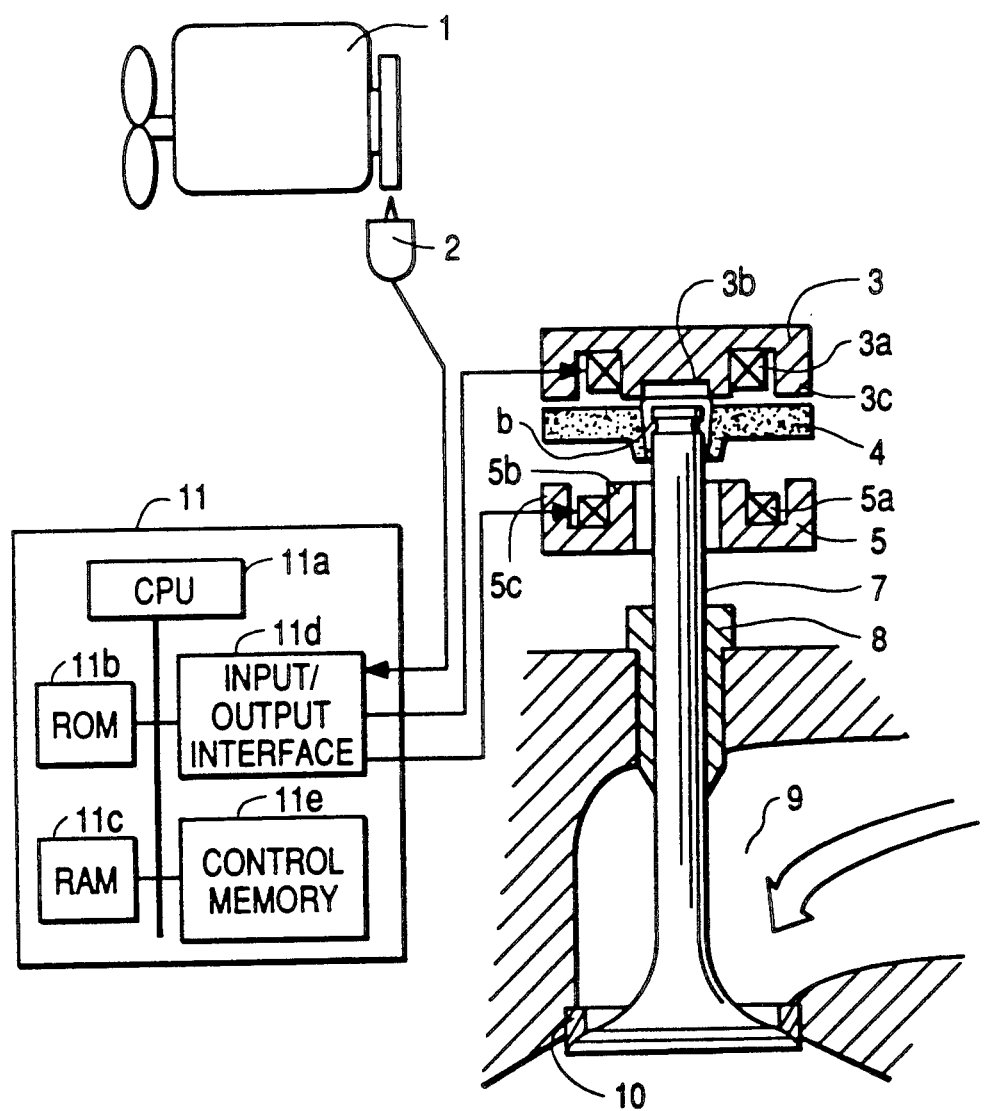
FIG. 1 is a block diagram showing an electromagnetic valve actuating system according to an embodiment of the present invention.

An embodiment of the present invention will hereinafter be described in detail with reference to the drawings.

FIG. 1 is a block diagram showing an actuating system according to an embodiment of the present invention.

An engine 1 has an output shaft, adjacent to which there is disposed a rotation sensor 2 for detecting the rotational speed and phase of the output shaft and converting the detected speed and phase into a signal. The engine 1 has intake and exhaust ports which are opened and closed by intake and exhaust valves, respectively. Of these intake and exhaust valves, the intake valve will mainly be described below.

An intake valve 7 comprises a highly strong and lightweight valve which is made of a nonmagnetic material such as ceramic. The intake valve 7 has a stem axially slidably supported by a valve guide 8.

A valve seat 10 is mounted in the intake port of an intake passage 9. The intake port is closed when the head of the intake valve 7 is closely held against the valve seat 10.

A permanent magnet 4 is connected to the stem end of the intake valve 7 by a clip 6. The permanent magnet 4 is of an annular shape and is magnetized such that its inner circumferential edge is of an S pole and its outer circumferential edge is of an N pole.

A circular upper electromagnet 3 is disposed a small distance upwardly of the permanent magnet 4 as it is positioned when the intake valve 4 is closed. The upper electromagnet 3 has an inner magnetic pole 3b positioned at its center and confronting the S pole of the inner circumferential edge of the permanent magnet 4. The upper electromagnet 3 also has an outer magnetic pole 3c at its outer circumferential portion, the outer magnetic pole 3c confronting the N pole of the outer circumferential edge of the permanent magnet 4.

An annular lower electromagnet 5 is disposed a small distance downwardly of the permanent magnet 4 as it is positioned when the intake valve 7 is open. The lower electromagnet 5 has an inner magnetic pole 5b at its inner circumferential edge in confronting relation to the S pole of the inner circumferential edge of the permanent magnet 4. The lower electromagnet 5 also has an outer magnetic pole 5c at its outer circumferential edge in confronting relation to the N pole of the outer circumferential edge of the permanent magnet 4.

The upper electromagnet 3 and the lower electromagnet 5 have respective upper and lower coils 3a, 5a.

The rotation sensor 2, the upper coil 3a, and the lower coil 5a are electrically connected to an input/output interface lid in a control unit 11.

The control unit 11 includes, in addition to the input/output interface lid which transmits output signals and receives an input signal, a ROM 11b for storing a program and data, a CPU 11a for effecting arithmetic operations under the control of the program stored in the ROM 11b, a RAM 11c for temporarily storing the input signals and the results of arithmetic operations, and a control memory 11e for controlling the flow of signals in the control unit 11.

Operation of the electromagnetic valve actuating system according to the present invention will be described below.

FIGS. 2(a) through 2(c) show the poles of the upper and lower electromagnets 3, 5. FIG. 2(a) shows the poles when the valve is to be closed. FIG. 2(b) shows the poles when the valve starts being opened from the closed condition, and FIG. 2(c) shows the poles when the valve starts to move in a closing direction after its movement in the opening direction has been decelerated.

In FIG. 2(a), the upper coil 3a is energized such that N and S poles are created respectively on the inner and outer magnetic poles 3b, 3c of the upper electromagnet 3, and the lower coil 5a is energized such that S and N poles are created respectively on the inner and outer magnetic poles 5b, 5c of the lower electromagnet 5.

An attractive force produced by the upper electromagnet 3 and a repelling force produced by the lower electromagnet 5 act on the permanent magnet 4. The intake valve 7 is held in a position in which the head of the intake valve 7 is closely held against the valve seat 10.

When the rotational phase of the engine 1 as detected by the rotation sensor 10 reaches the timing to open the intake valve 7, the direction in which the upper and lower coils 3a, 5a is reversed. The poles of the upper and lower electromagnets 3, 5 are now such that an S pole is created on the inner magnetic pole 3b, an N pole on the outer magnetic pole 3c, an N pole on the inner magnetic pole 5b, and an N pole on the outer magnetic pole 5c, as shown in FIG. 2(b).

Now, the permanent magnet 4 is subjected to a repelling force from the upper electromagnet 3 and an attractive force from the lower electromagnet 5, so that the intake valve 7 starts moving downwardly, i.e., in the opening direction.

At the same as as the above timing to open the intake valve 7, time starts being counted in the engine 1. When the counted time reaches a first preset time, the direction in which the upper and lower coils 3a, 5a are energized is reversed to produce magnetic poles as shown in FIG. 2(a).

The permanent magnet 4 is subjected to an upward force, decelerating the intake valve 7 moving in the downward direction, and the intake valve 7 is finally stopped.

FIG. 2(c) shows the condition when the intake valve 7 is stopped.

When the poles of the upper and lower electromagnets 3, 5 remain the same even after the intake valve 7 is stopped, the intake valve 7 starts moving upwardly, i.e., in the closing direction since the upward force still acts on the permanent magnet 4.

After elapse of the first preset time, and upon elapse of a second preset time, the direction in which the upper and lower coils 3a, 5a are energized is reversed again, bringing the poles of the upper and lower electromagnets 3, 5 into the condition shown in FIG. 2(b), so that a downward force is applied to the permanent magnet 4.

The upward movement of the intake valve 7 is now decelerated, thereby preventing the head of the intake valve 7 from impinging upon the valve seat 10.

Upon elapse of a third preset time which is required to decelerate the intake valve 7 as described above, the direction in which the upper and lower coils 3a, 5a are energized is reversed, thereby to allow the head of the intake valve 7 to closely contact the valve seat 10 quietly. The intake valve 7 remains closed until next timing to open the intake valve 7.

FIG. 3 shows the relationship between the distance traversed by the intake valve 7 and time.

The horizontal axis of the graph indicates the time elapsed from the opening timing of the intake valve 7, and the vertical axis indicates the distance by which the intake valve 7 moves from the closed condition to the open condition.

From the time at which the valve is opened until the first preset time elapses, the intake valve 7 moves while being accelerated in the opening direction. After elapse of the second preset time, the movement of the intake valve 7 in the closing direction is decelerated. At the same time that the deceleration is finished, a force in the closing direction is applied to the intake valve 7, holding the intake valve 7 closed.

The first, second, and third preset times are determined as follows: A table of preset times and engine rotational speeds is stored in advance in the ROM 11b, and a preset time corresponding to a certain engine rotational speed is determined from the table based on the engine rotational speed.

The ROM 11b may store, in addition to the table of preset times and engine rotational speeds, a map of engine rotational speeds and valve opening timing values. By varying the valve opening timing depending on the engine rotational speed using the map, the engine output and efficiency can be increased in a full range of engine rotational speeds.

Furthermore, an engine cylinder control process for increasing or reducing the number of engine cylinders that are in operation can be carried out by actuating or disabling the intake and exhaust valves associated with the engine cylinders depending on the rotational speed of the engine 1.

While the intake valve has been described above, the actuating system of the present invention is also applicable to the exhaust valve, which is omitted from illustration.

Although a certain preferred embodiment has been shown and described, it should be understood that the present invention should not be limited to the illustrated embodiment but many changes and modifications may be made therein without departing from the scope of the appended claims.

INDUSTRIAL APPLICABILITY

As described above, the electromagnetic valve actuating system according to the present invention can be used as a system for actuating intake and exhaust valves of an engine, and suitable for use with an engine which is required to vary the timing to open and close the intake and exhaust valves.

I claim:

1. An electromagnetic valve actuating system for opening and closing a valve such as an intake and exhaust valve of an engine without mechanical spring force, comprising:
    a permanent magnet coupled to the valve, said permanent magnet being mounted for reciprocating movement;
    a first electromagnet confronting said movable permanent magnet at one end of a line of the reciprocating movement;
    a second electromagnet having a hole through which said valve extends, said second electromagnet confronting said permanent magnet at the other end of the line of the reciprocating movement and being spaced from said first electromagnet with said permanent magnet interposed between said first and second electromagnets; and
    energization control means for independently energizing said first and second electromagnets to alternatively attract said permanent magnet to confront said first electromagnet while repelling said permanent magnet from said second electromagnet and repel said permanent magnet from said first electromagnet while attracting said permanent magnet to confront said second electromagnet, to open and close said valve without mechanical spring force.

2. An electromagnetic valve actuating system according to claim 1, wherein said valve is made of ceramic.

3. An electromagnetic valve actuating system according to claim 1, wherein said energization control means applies a repelling force acting between said first electromagnet and said movable permanent magnet before said valve is seated, thereby lessening shocks produced when the valve is seated.

4. An electromagnetic valve actuating system according to claim 1, wherein the timing established by said energization control means to open and close the valve is variable as the rotational speed of the engine varies.

5. A valve control system in an engine, comprising:
    electromagnets having coils;
    a valve positioned between said electromagnets and having a permanent magnet movable along a line of reciprocating movement between said electromagnets to confront one of said electromagnets at an end of the line of reciprocating movement; and
    control means for opening and closing said valve by independently energizing and deenergizing the coils of said electromagnets at timings corresponding to a speed of the engine, to alternatively attract said permanent magnet to confront said first electromagnet while repelling said permanent magnet from said second electromagnet and repel said permanent magnet from said first electromagnet while attracting said permanent magnet to confront said second electromagnet.

6. A valve control system according to claim 5, further comprising speed detection means for detecting a speed of the engine, and wherein said control means comprises a control unit including an input/output interface connected to said electromagnets and said speed detection means, a storage means for storing a table of the timings corresponding to different speeds of the engine, and a processor calculating the timing spaced on the speed detected by said detection means.

7. A valve control system according to claim 6, wherein said electromagnets comprise an upper electromagnet and a lower electromagnet, each separately connected to the input/output interface and separately controlled by the control unit, and wherein the permanent magnet of said valve is positioned between the upper electromagnet and lower electromagnet and upwardly and downwardly movable corresponding to an energizing and deenergizing of the upper electromagnet and lower electromagnet by said control means.

8. A method of controlling a valve in an engine with electromagnets, comprising the steps of:
    (a) providing the valve with a permanent magnet movable along a line of reciprocating movement between said electromagnets to confront one of said electromagnets at an end of the line of reciprocating movement;
    (b) detecting the speed of the engine;
    (c) reading the speed of the engine into a computer; and
    (d) energizing and deenergizing the electromagnets to open and close the valve by moving the permanent magnet at timings corresponding to the speed of the engine under control of the computer, to alternatively attract said permanent magnet to confront said first electromagnet while repelling said permanent magnet from said second electromagnet, and repel said permanent magnet from said first electromagnet while attracting said permanent magnet to confront said second electromagnet.

9. A method according to claim 8, wherein said energizing and deenergizing of the electromagnet in step (d) is performed at timings read by the computer from a preset speed/timing table based on the speed of the engine.

10. A method according to claim 9, wherein the electromagnets include an upper electromagnet and a lower electromagnet, and wherein step (d) further comprises the steps of (d1) holding the valve closed by energizing the upper electromagnet until a first timing, (d2) opening the valve by deenergizing the upper electromagnet and energizing the lower electromagnet until a second timing, (d3) closing the valve by energizing the upper electromagnet and deenergizing the lower electromagnet until a third timing, and (d4) decelerating the valve before it is closed by deenergizing the upper electromagnet and energizing the lower electromagnet until a fourth timing.

11. A method according to claim 10, wherein steps (d1) through (d4) are repeated with each full piston stroke of the engine.

* * * * *